(12) United States Patent
Kuboi et al.

(10) Patent No.: US 9,881,104 B2
(45) Date of Patent: Jan. 30, 2018

(54) SIMULATING SHAPE OF A WORKPIECE BASED ON A FLUX

(71) Applicant: Sony Corporation, Tokyo (JP)

(72) Inventors: Nobuyuki Kuboi, Kanagawa (JP); Takashi Kinoshita, Kanagawa (JP)

(73) Assignee: Sony Corporation, Tokyo (JP)

(*) Notice: Subject to any disclaimer, the term of this patent is extended or adjusted under 35 U.S.C. 154(b) by 1127 days.

(21) Appl. No.: 14/067,538

(22) Filed: Oct. 30, 2013

(65) Prior Publication Data
US 2014/0129203 A1 May 8, 2014

(30) Foreign Application Priority Data
Nov. 7, 2012 (JP) .................. 2012-245316

(51) Int. Cl.
G06F 17/50 (2006.01)
G06F 17/10 (2006.01)

(52) U.S. Cl.
CPC ...... *G06F 17/5009* (2013.01); *G06F 2217/16* (2013.01)

(58) Field of Classification Search
CPC .................. G06F 17/5009; G06F 2217/16
USPC .................................... 703/13, 14
See application file for complete search history.

(56) References Cited

U.S. PATENT DOCUMENTS

| 9,116,834 B2 * | 8/2015 | Van Beurden | |
| 2009/0061445 A1 * | 3/2009 | Oltvai | G06F 19/12 435/6.13 |
| 2009/0153956 A1 * | 6/2009 | Kusaka | G02B 21/08 359/385 |

FOREIGN PATENT DOCUMENTS

JP  2002-050553  2/2002

OTHER PUBLICATIONS

Suratwala et al. (HF-based etching processes for improving laser damage resistance of fused silica optical surfaces, 2010 (32 pages)).*
Osano, Y., et al. "A Model Analysis of Feature Profile Evolution and Microscopic Uniformity during Polysilicon Gate Etching in Cl2/O2 Plasmas", Japanese Journal of Applied Physics, vol. 45, No. 10B, pp. 8157-8162, 2006.

* cited by examiner

*Primary Examiner* — Andre Pierre Louis
(74) *Attorney, Agent, or Firm* — Chip Law Group

(57) ABSTRACT

A simulation method to cause an information processing device to calculate, including: reversely tracing a first flux incident on any position on a surface of a workpiece subject to processing treatment from the position; when the first flux strikes another position on the workpiece surface as a result of the reverse tracing of the first flux, calculating a second flux to be the first flux by scattering at the another position and reversely tracing the second flux from the another position; and, by repeating calculation and reverse tracing of flux, when the reversely traced flux no longer strikes the workpiece surface, carrying out comparison of the flux with an angular distribution of a flux incident on the workpiece, and when the current flux is within the angular distribution, obtaining an amount of flux having contributed to the scattering for a flux group from the first flux to the current flux.

14 Claims, 13 Drawing Sheets

SIMULATING SHAPE OF A WORKPIECE BASED ON A FLUX

CROSS REFERENCE TO RELATED APPLICATIONS

This application claims the benefit of Japanese Priority Patent Application JP 2012-245316 filed Nov. 7, 2012, the entire contents of which are incorporated herein by reference.

BACKGROUND

The present disclosure relates to a simulation method that simulates a shape of a workpiece in processing treatment, a simulation program and a simulator that execute the simulation method. The present disclosure also relates to processing equipment provided with the simulator and to a method of manufacturing a semiconductor device using the processing equipment.

There is process shape (etching, deposition) simulation as a technique to predict semiconductor processing, which is recognized by being roughly categorized in two models. One is a string model, and the other is a voxel model.

In the string model, grid points are arranged on the surface of the shape and a surface reaction is numerically solved at each grid point to derive a reaction rate, and further the coordinates of the grid points are moved in accordance with the reaction rate in the normal direction and each grid point is joined together by a string. The string model thus expresses development of the process shape.

In the string model, the normal line is derived using positional information of adjacent grid points, so that the derivation method is easy.

On the other hand, due to the characteristics of the derivation method, the string model is poor in capability to follow sharp change in shape and the strings sometimes turn out to cross each other.

In contrast, in the voxel model, a shape is expressed by determining whether or not an arranged voxel exists, so that the voxel model is good in reproducibility of a complex shape, such as a microtrench, compared with the string model.

Since the voxel model is generally a calculation approach using the Monte Carlo method, so that it is easy to simulate transfer of gas, such as ions or radicals in a pattern, and a micro physical phenomenon and a chemical reaction on the surface, and thus it is recognized as a useful approach to replace the string model.

As modeling of ion transfer in shape simulation using the voxel model, there are recognized mainly two methods.

One is a model based on the Monte Carlo method, and the other is a model based on the flux method.

With a model based on the Monte Carlo method, ions with energy distribution and incident angular distribution that are calculated in a sheath region, for example, are incident on a pattern to solve penetration, scattering, and propagation of ions to pattern side walls in the Monte Carlo method (for example, refer to Osano et al., Japanese Journal of Applied Physics, Vol. 45, No. 10B, (2006), pp. 8157-8162).

With a model based on the flux method, ion transfer is handled by solving a simultaneous reaction equation related to balance of an amount of an incident ion flux and an amount of reemission utilizing, for example, the radiosity method (for example, refer to Japanese Unexamined Patent Application Publication No. 2002-50553). That is, ion transfer is handled by solving an inverse matrix of iN×iN in a two-dimensional space and an inverse matrix of iN×iN×iN in a three-dimensional space (i denotes the number of particles contributing to the reaction, and N denotes the number of voxels existing on the surface). At this time, the scattering and the direct incidence are handled at the same time.

SUMMARY

However, in order to carry out calculation with a model based on the Monte Carlo method, at least one or more ions have to be allocated to all shape surface voxels and it takes a lot of calculation time.

In addition, the calculation time and the calculation accuracy are in trade-off relationship in any case, and thus shorter calculation time causes a decrease in the calculation accuracy.

With the model based on the flux method described in Japanese Unexamined Patent Application Publication No. 2002-50553, an inverse matrix of a very large matrix, which is an inverse matrix of iN×iN in the two-dimensional space and an inverse matrix of iN×iN×iN in the three-dimensional space, has to be solved for each time step. Therefore, as the surface reaction becomes more detailed, the calculation algorithm becomes complex and also the calculation rate severely decreases.

Recently, as expressed in the international technology roadmap for semiconductors (ITRS), miniaturization of CMOS devices advances more and more, and there are demands for prediction calculation, process control, and in-plane uniformity of a minute process shape in 20 nm generation or later.

The ion transfer model for three dimensional voxel model that has been proposed in the past has strong limitations in terms of the calculation time and the calculation accuracy.

It is desirable to provide a simulation method, a simulation program, and a simulator that have a fast calculation rate and good calculation accuracy and are capable of reducing calculation load. It is also desirable to provide processing equipment provided with the simulator, and a method of manufacturing a semiconductor device using the processing equipment.

A simulation method of an embodiment in the present disclosure is to carry out calculation including steps of (1) through (3) below by an information processing device.

(1) Reversely tracing a first flux incident on an arbitrary position on a surface of a workpiece subject to predetermined processing treatment from the arbitrary position.

(2) In a case that the first flux strikes another position on the surface of the workpiece as a result of (1), calculating a second flux to be the first flux by scattering at the another position and reversely tracing the second flux from the another position.

(3) By repeating the calculation and the reverse tracing of flux, when the reversely traced flux no longer strikes the surface of the workpiece, carrying out comparison of the flux with an angular distribution of a flux incident on the workpiece, and when the current flux is within the angular distribution, obtaining an amount of flux that has contributed to the scattering for a flux group from the first flux to the current flux.

A simulation program of an embodiment in the present disclosure is to be executed by implementing the following processes of (1) through (3) to an information processing device.

(1) Reversely tracing a first flux incident on an arbitrary position on a surface of a workpiece subject to predetermined processing treatment from the arbitrary position.

(2) In a case that the first flux strikes another position on the surface of the workpiece as a result of (1), calculating a second flux to be the first flux by scattering at the another position and reversely tracing the second flux from the another position.

(3) By repeating the calculation and the reverse tracing of flux, when the reversely traced flux no longer strikes the surface of the workpiece, carrying out comparison of the flux with an angular distribution of a flux incident on the workpiece, and when the current flux is within the angular distribution, obtaining an amount of flux that has contributed to the scattering for a flux group from the first flux to the current flux.

A simulator of an embodiment in the present disclosure is a simulator provided with an arithmetic unit that simulates predetermined processing treatment to a workpiece. Then, the simulator of an embodiment in the present disclosure includes the arithmetic unit to carry out calculation including the following steps of (1) through (3).

(1) Reversely tracing a first flux incident on an arbitrary position on a surface of a workpiece subject to predetermined processing treatment from the arbitrary position.

(2) In a case that the first flux strikes another position on the surface of the workpiece as a result of (1), calculating a second flux to be the first flux by scattering at the another position and reversely tracing the second flux from the another position.

(3) By repeating the calculation and the reverse tracing of flux, when the reversely traced flux no longer strikes the surface of the workpiece, carrying out comparison of the flux with an angular distribution of a flux incident on the workpiece, and when the current flux is within the angular distribution, obtaining an amount of flux that has contributed to the scattering for a flux group from the first flux to the current flux.

Processing equipment of an embodiment in the present disclosure includes a processing unit to carry out predetermined processing treatment to a workpiece and a simulator of an embodiment in the present disclosure.

A method of manufacturing a semiconductor device of an embodiment in the present disclosure, using processing equipment of an embodiment in the present disclosure, includes carrying out predetermined processing treatment to a workpiece taking at least a part of a semiconductor device as the workpiece.

According to the simulation method of an embodiment in the present disclosure, a first flux is reversely traced from an arbitrary position on a surface of a workpiece, and in a case of striking another position on the surface of the workpiece, a second flux to be the first flux by scattering is calculated. Then, when the current flux no longer strikes the surface of the workpiece, comparison of the current flux with an angular distribution of a flux incident on the workpiece is carried out. Then, when the current flux is within the angular distribution, an amount of flux that has contributed to scattering is obtained for a flux group from the first flux to the current flux.

This enables calculation of the amount of flux that has contributed to scattering at light calculation load by removing undesired flux that is not generated actually by the comparison with the angular distribution of the flux incident on the workpiece.

According to the simulation program of an embodiment in the present disclosure, processes are executed to reversely trace a first flux from an arbitrary position on a surface of a workpiece, and in a case of striking another position on the surface of the workpiece, to calculate a second flux to be the first flux by scattering. Then, when the current flux no longer strikes the surface of the workpiece, comparison of the current flux with an angular distribution of a flux incident on the workpiece is carried out, and in a case that the current flux is within the angular distribution, process to obtain an amount of flux that has contributed to scattering is executed for a flux group.

This enables calculation of the amount of flux that has contributed to scattering at light calculation load by removing undesired flux that is not generated actually by the comparison with the angular distribution of the flux incident on the workpiece.

According to the simulator of an embodiment in the present disclosure, an arithmetic unit reversely traces a first flux from an arbitrary position on a surface of a workpiece, and in a case of striking another position on the surface of the workpiece, a second flux to be the first flux by scattering is calculated. Then, the arithmetic unit carries out comparison of the current flux with an angular distribution of a flux incident on the workpiece when the current flux no longer strikes the surface of the workpiece to obtain an amount of flux that has contributed to scattering for a flux group when the current flux is within the angular distribution.

This enables calculation of the amount of flux that has contributed to scattering at light calculation load by removing undesired flux that is not generated actually by the comparison with the angular distribution of the flux incident on the workpiece.

According to the processing equipment of an embodiment in the present disclosure, a processing unit that carries out predetermined processing treatment to a workpiece and a simulator of an embodiment in the present disclosure are provided. This enables calculation of an amount of flux that has contributed to scattering at light calculation load to carry out simulation for a shape of a workpiece, allowing utilization of the simulation in processing treatment in the processing unit.

According to the method of manufacturing a semiconductor device of an embodiment in the present disclosure, using processing equipment of an embodiment in the present disclosure, carrying out the predetermined processing treatment to the workpiece is included taking at least a part of a semiconductor device as the workpiece. This enables calculation of an amount of flux that has contributed to scattering at light calculation load to carry out simulation for a shape of a workpiece, allowing utilization of the simulation in carrying out predetermined processing treatment to the workpiece.

According to the embodiment in the present disclosure, it is possible to calculate an amount of flux that has contributed to the scattering at light calculation load to carry out simulation for a shape of a workpiece.

In addition, since the flux incident on a workpiece is calculated, that is, the flux method is employed, it is possible to carry out simulation for, for example, shapes and damages of a workpiece with higher calculation accuracy and at a higher calculation rate than simulation using the Monte Carlo method in the past.

Since improvement in accuracy and acceleration of the calculation is achieved, it then becomes possible to implement a simulator that simulates shapes and damages to processing equipment and control processing treatment using the simulator, which used to be difficult in the past.

DETAILED DESCRIPTION OF EMBODIMENTS

Figure 1:
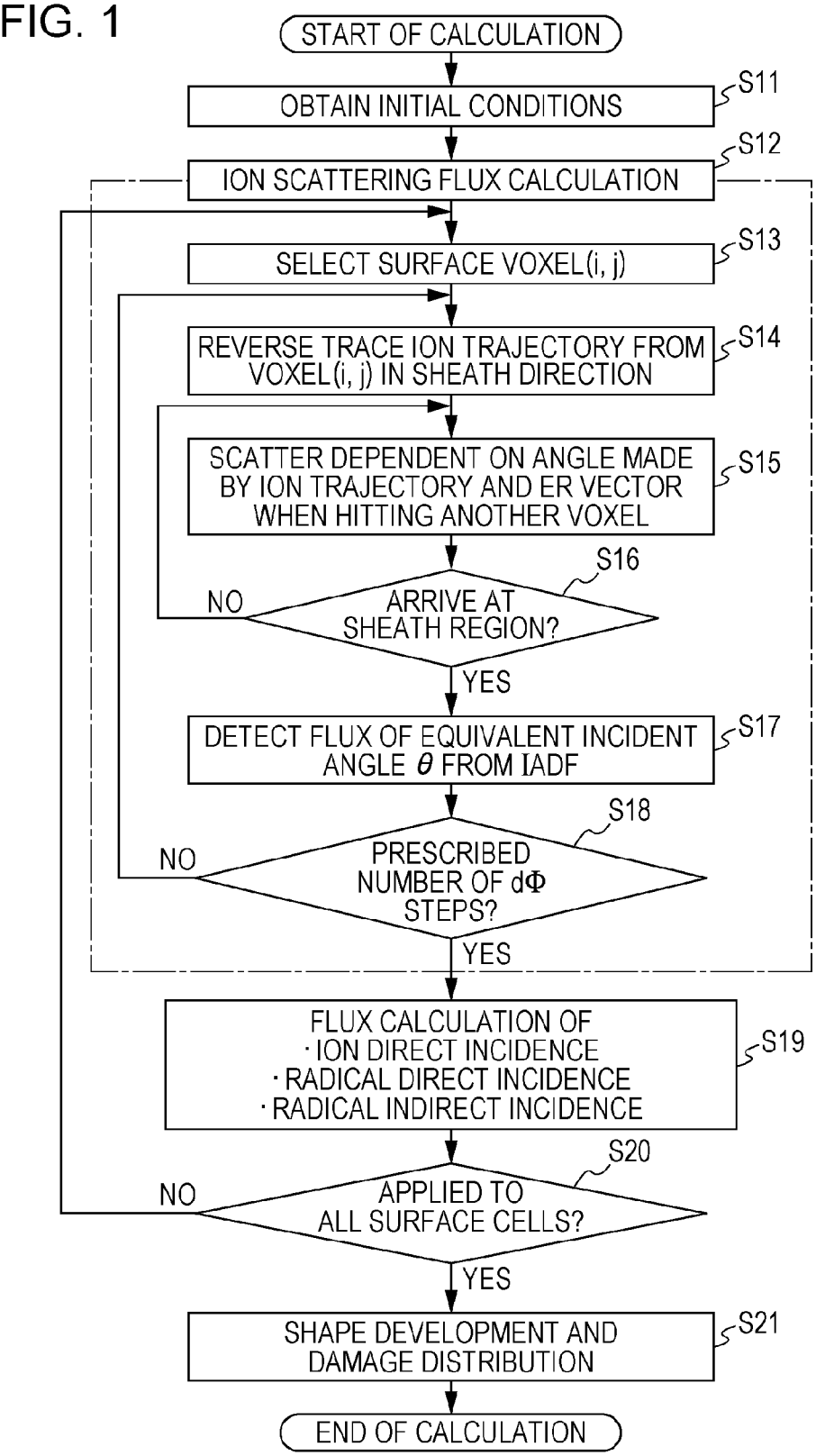
FIG. 1 is a flowchart of one mode of a simulation method according to an embodiment in the present disclosure.

The following descriptions are given to best modes (hereinafter, referred to as embodiments) for carrying out embodiments of the present disclosure.

The descriptions are given in the following order:
1. Outline of embodiments of the present disclosure;
2. First embodiment (simulator);
3. Second embodiment (calculation of ion scattering flux);
4. Third embodiment (shape simulation);
5. Fourth embodiment (damage simulation);
6. Fifth embodiment (simulation software);
7. Sixth embodiment (semiconductor processing equipment);
8. Seventh embodiment (semiconductor processing equipment);
9. Eighth embodiment (method of manufacturing a semiconductor device); and
10. Ninth embodiment (electronic device)

1. Outline of Embodiments of the Present Disclosure

Firstly, an outline of embodiments of the present disclosure is described.

Embodiments of the present disclosure are a simulation method that carries out calculation of each procedure of (1) through (3) below, a simulation program and a simulator that execute the simulation method, processing equipment that is provided with the simulator, and a method of manufacturing a semiconductor device using the processing equipment.

(1) In a workpiece subject to predetermined processing treatment, a first flux incident on an arbitrary position on a surface of a workpiece is reversely traced from the arbitrary position.

That is, a model in which a workpiece includes, for example, a plurality of voxels or a plurality of grid points is applied. Then, an incident ion trajectory is reversely traced from a center of gravity of the voxels or a grid point that exists on a surface of the workpiece in the opposite direction of the incidence (for example, direction of the sheath region in plasma etching).

(2) As a result of the reverse trace of the first flux, in a case that the first flux strikes another position on the surface of the workpiece, a second flux to be the first flux by scattering at that another position is calculated. Then, the second flux is reversely traced from that another position.

That is, in a case that, for example, an incident ion trajectory strikes another center of gravity of the voxels or a grid point on the surface of the workpiece when reversely traced, flying ions are scattered. The scattering angle at this time is preferably an angle dependent on the angle that is made by the ion flight trajectory and the surface normal vector (etch rate vector), and ions are emitted again in the sheath direction.

(3) After repeating the calculation of the flux and the reverse trace, when the reversely traced flux no longer strikes the surface of the workpiece, comparison of the current flux with the angular distribution of the flux incident on the workpiece is carried out. Then, when the current flux is within the angular distribution, an amount of flux that has contributed to the scattering is obtained for a flux group from the first flux (obtained by the reverse trace) to the current flux.

That is, for example, a final arrival angle θ to the sheath region of the flux is compared with the incident angular distribution of the ion flux (ion angular distribution function: IADF) to determine an amount of ion flux that has contributed to scattering when the final arrival angle θ is within the incident angular distribution. Further, each procedure of (1) through (3) is repeated in dΦ steps for an angular region in a space region overlooked from the corresponding center of gravity of the voxels or a grid point (region outside the workpiece) to calculate a final total ion scattering flux.

A simulation method of an embodiment in the present disclosure is to carry out calculation of each procedure described above.

A simulation program of an embodiment in the present disclosure is to be executed by implementing the treatment of each procedure described above to an information processing device.

A simulator of an embodiment in the present disclosure is to be provided with an arithmetic unit that simulates predetermined processing treatment to a workpiece, and the arithmetic unit is to carry out calculation including each procedure described above.

Processing equipment of an embodiment in the present disclosure is to be provided with a processing unit that carries out predetermined processing treatment to a workpiece and with the simulator of an embodiment in the present disclosure.

A method of manufacturing a semiconductor device of an embodiment in the present disclosure is to have the steps of: using the processing equipment of an embodiment in the present disclosure; and carrying out predetermined processing treatment to a workpiece taking at least a part of a semiconductor device as the workpiece. For example, predetermined processing treatment is carried out taking some layers, some region, or the like of a semiconductor device as the workpiece.

Detailed descriptions are given below to embodiments of the present disclosure.

As a matter of convenience, here, two dimensional calculation is assumed for the descriptions, although extension to three dimensional calculation is easy. In addition, although the descriptions are given by taking a voxel model as an example, it is also easily applicable to a shape development model, such as the string method and the level-set method, other than that.

FIG. 1 illustrates a flowchart of one mode of a simulation method according to an embodiment in the present disclosure.

The flowchart in FIG. 1 illustrates the entire calculation procedure in the simulation method according to an embodiment in the present disclosure.

Firstly, in step S11, initial conditions are obtained by inputting the initial conditions (flux, recipe conditions, device conditions, pattern structure, and parameters for calculation).

After that, the procedure goes on to ion scattering flux calculation in step S12.

Next, in step S13, a voxel (i, j) that exists on the surface is selected.

In a case of the string method, a grid point is selected instead of a voxel. In the case of the string method, a grid point, instead of a voxel, and a position of a grid point, instead of a center of gravity position of a voxel, are also used in the following steps.

Next, in step S14, an ion trajectory is reversely traced from the center of gravity position of the selected voxel in the sheath direction. The tracing direction is determined in a range angle [Φ1, Φ2] overlooked from the corresponding voxel in dΦ steps.

After the reverse trace, at the time of hitting another voxel as illustrated in step S15, the trajectory is scattered in the sheath direction, depending on the angle that is made by the ion trajectory and an ER vector (etch rate vector, that is, normal vector) of that voxel.

Then, as illustrated in step S16, until the ion trajectory after the scattering arrives at the sheath, similar propagation calculation is repeated.

In a case of arriving at the sheath, the procedure goes on to step S17 to calculate a partial flux content at an equivalent arrival incident angle θ using the incident angular distribution IADF.

Next, in step S18, steps S14 through S17 are repeated up to a prescribed number of dΦ steps in the range angle.

When reaching the prescribed number of dΦ steps, the procedure goes on to step S19 to calculate a flux that is incident on the corresponding voxel. All fluxes (direct and indirect incident fluxes of radicals and a direct incident flux of ions that are separately calculated) including this flux are used for calculation of the etch rate.

Next, in step S20, whether or not the calculation has been applied to all voxels that exist on the surface is checked. Then, in a case that there is a voxel to which the calculation has not yet been applied, the procedure goes back to step S13 to select a next voxel.

In a case that the calculation has been applied to all voxels, the procedure goes on to step S21 to carry out shape development and damage calculation.

Figure 2:
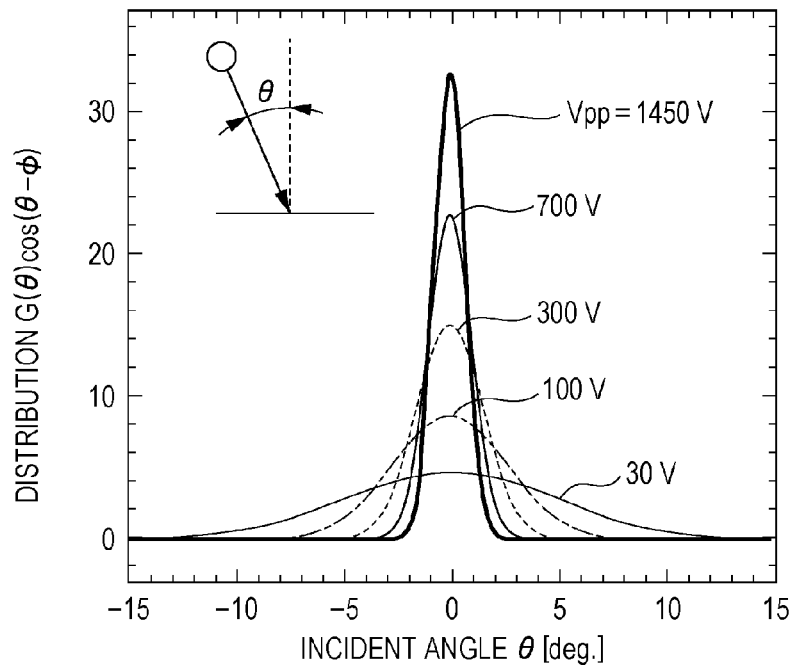
FIG. 2 illustrates relationship between the accelerating voltage and the angular distribution of fluxes.
Figure 3:
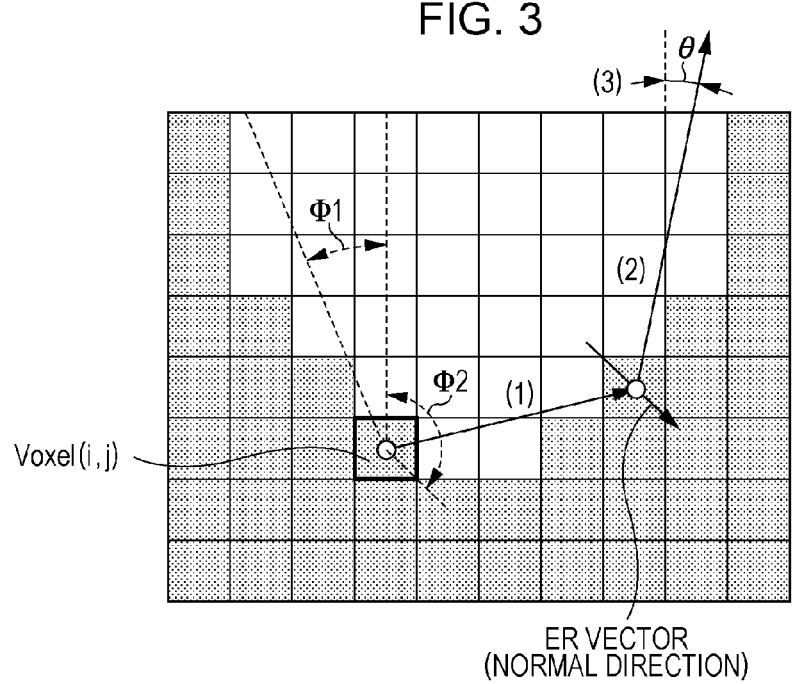
FIG. 3 illustrates reverse trace from a certain voxel.

FIGS. 2 through 3 illustrate conceptual diagrams of such calculation related to the ion scattering and also the following gives detailed descriptions of the procedure of (1) through (3) described before.

FIG. 2 illustrates relationship between the accelerating voltage and the angular distribution of fluxes, such as ions. The angular distribution in FIG. 2 is obtained by the IADF. As seen from FIG. 2, as the accelerating voltage is larger, the angular range of the flux becomes narrower.

FIG. 3 illustrates reverse trace from a certain voxel (i, j).

(1) Procedure of Reverse Tracing an Incident Flux

In this procedure, a first flux incident on an arbitrary position on a surface of a workpiece is reversely traced from the arbitrary position.

That is, in the configuration of FIG. 3, for example, an ion is reversely traced from a center of gravity of an arbitrary voxel (i, j) that is arranged on a surface of the process shape towards the direction of the sheath region. On that occasion, the tracing direction is in a range angle [Φ1, Φ2] overlooked from the center of gravity of the corresponding voxel illustrated in FIG. 3.

In addition, for acceleration of the calculation, consideration is given in an even more tightly targeted angular range by the angular range where the flux exists illustrated in FIG. 2, and the trace is carried out for each dΦ step in this range.

In the present procedure, in a case of applying the string method, a grid point is used instead of the center of gravity of a voxel.

Operations in this procedure are specifically described below.

Figure 4:
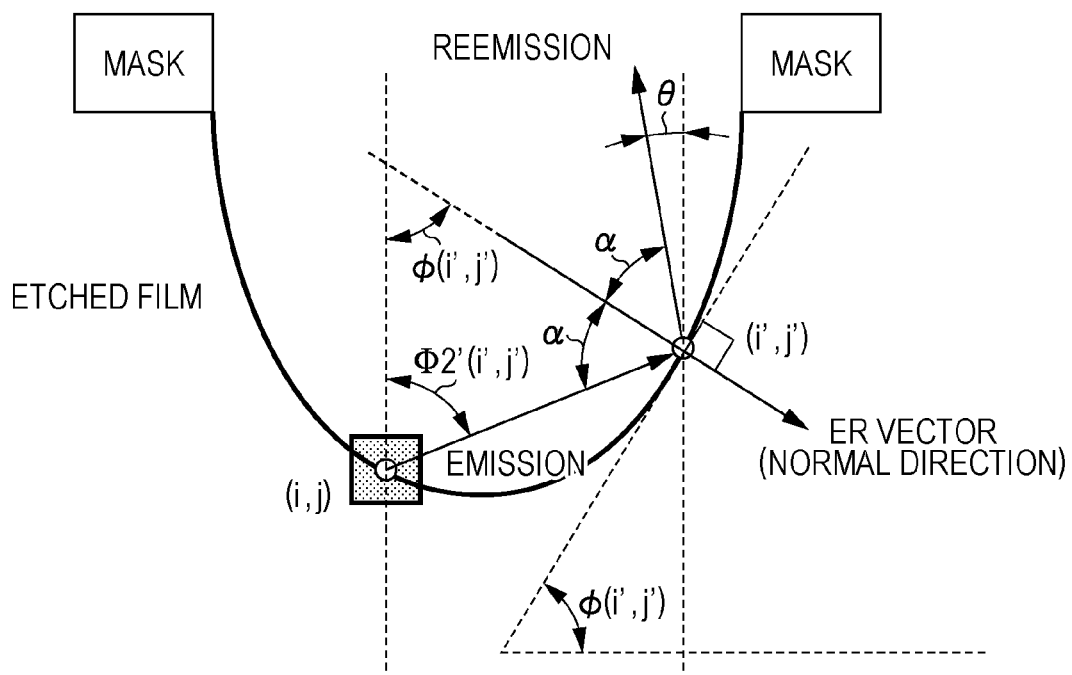
FIG. 4 illustrates relationship between each angle in FIG. 3.

FIG. 4 illustrates the relationship between each angle in FIG. 3. FIG. 4 illustrates geometric relationship by adding auxiliary lines, an angle φ (i, j), and the like to each angle in FIG. 3.

When reversely traced from the voxel (i, j), an emission flux strikes the surface at a voxel (i', j') to make an ER vector, where the emission flux and a reemission flux are symmetrical to each other and make an angle α with the ER vector. The angle φ (i', j') is an angle that is made by the vertical direction and the ER vector at the voxel (i', j').

Considering s geometric relationship as FIG. 4, the following formulas (1) and (2) hold.

$$\varphi2'(i',j')=180°-\varphi(i',j')-\alpha \quad (1)$$

$$\alpha+\theta=\varphi \quad (2)$$

From these two formulas, α is deleted and θ is expressed by Φ2' and φ, they may be expressed as the following formula (3).

$$\theta=\varphi2'(i',j')-180°+2\varphi(i',j') \quad (3)$$

This θ has only to fall within an angular range [−θ min, θ max] where the flux exists. That is, the range of Φ2' is expressed by the following formula (4).

$$-\theta_{min}+180°-2\varphi(i',j')\leq\varphi2'(i',j')\leq\theta_{max}+180°-2\varphi(i',j') \quad (4)$$

This is applied to a voxel on a processed surface on the φ2 range side to obtain φ2'min as the minimum and φ2'max as the maximum.

In the range of these two angles, reverse trace calculation is executed.

Similarly, the angular range is also limited for the range of φ1 in FIG. 3.

Accordingly, trace in these ranges may be carried out in the dΦ steps.

In such a manner, the angular range is limited in carrying out the reverse trace, thereby making it possible to efficiently carry out reverse trace.

In the above descriptions, it is assumed that the trace trajectory is a straight line (there is no interaction with an electric field produced by other particles and a charging effect). In contrast, in a case that the trace trajectory is assumed as a curved line by taking an effect of bending the path due to an effect, such as charging, into consideration, a parameter of a (=1+Δ1) is introduced as the following formula (5) to use a formula with a corrected range. Here, Δ1 is a small angle.

$$a(-\theta_{min}+180°-2\varphi(i',j'))\leq\varphi2'(i',j')\leq a(\theta_{max}+180°-2\varphi(i',j')) \quad (5)$$

(2) Procedure of Calculating a Flux Before Scattering from a Flux after the Scattering Considering a Scattering Effect at Another Position on the Surface of the Workpiece In a case of striking another position on the surface of the workpiece during the reverse trace, a second flux to be the first flux by scattering at that another position is calculated (considering the scattering effect at that position).

That is, in the configuration of FIG. 3, in a case of striking another voxel that exists on the surface of the process shape during the reverse trace, a flux before scattering is calculated by handling the scattering.

In the scattering, the angle after scattering is determined by the angle α that is made by the traced ion path and the surface normal vector (etch rate vector) of the struck voxel (refer to FIG. 4).

In a case of applying the string method in the present procedure, the surface normal vector of a grid point is used instead of the surface normal vector of a voxel.

Since a surface reaction where ions are involved at the time of the scattering, it is preferred that energy loss associated with the change in physical quantity is considered. That is, energy of ion is lost depending on the thickness of a deposited film (such as a polymer film and an oxide film) formed on the surface or the energy is distributed among the mass of atoms constituting the etched film and the mass of incident ions.

Further, the angle after scattering is to be the incident angle α (specular scattering) or small angular variation (variation from the specular scattering) is to be taken into consideration to the incident angle α. In this case of considering the angular variation, the angular range falls out of the formula (5). In that case, a parameter of b (=1+Δ2) is introduced as the following formula (6) to expand the angular range for search.

$$(a+b)(-\theta_{min}+180°-2\varphi(i',j'))\leq\varphi2'(i',j')\leq(a+b)(\theta_{max}+180°-2\varphi(i',j')) \quad (6)$$

(3) Procedure of Obtaining the Amount of Flux Contributing to Scattering

When the procedures of (1) and (2) are repeated and the reversely traced flux no longer strikes the surface of the workpiece, comparison with the angular distribution of the flux incident on the workpiece is carried out. Then, when the comparison result is within the angular distribution, the amount of flux that has contributed to the scattering is obtained for the flux group obtained by the reverse trace.

That is, in a case that the ions arrive at the sheath region immediately above the pattern in the configuration of FIG. 3, for example, the partial flux content is calculated from the IADF (dependent on the ion energy and the incident angle) obtained by an analytic formula, sheath simulation, or actual measurement. At this time, using a sheath penetration angle θ (refer to FIGS. 2 through 4) and energy information, the partial flux content is calculated.

Each IADF is normalized by the flux total sum in the considered energy range.

In a case that the result of carrying out comparison with the angular distribution of the flux incident on the workpiece is not within the angular distribution, the flux group reversely traced from the first flux to the sheath region is not subject to the calculation of partial flux content.

That is, in the configuration of FIG. 3, for example, in a case that the sheath penetration angle θ is larger than the angular distribution of the actually generated flux as illustrated in FIG. 2, the two fluxes from the voxel (i, j) to the sheath region are removed from the subject of partial flux content calculation.

Then, the procedures of (1) through (3) are carried out in all dΦ steps in the search range described in (1), thereby obtaining a relative total ion scattering flux $\Gamma_i^s$.

Further, the ions that are emitted from the opened region on the upper surface of the workpiece and directly incident on the voxel (i, j) are derived from the IADF, thereby calculating a direct incident flux $\Gamma_i^d$ of ions to the voxel (i, j). In a case of applying the string method in the present procedure, a grid point (i, j) is used instead of the voxel (i, j).

Then, normalization is carried out in such a manner that a sum of these two fluxes becomes an ion flux value $\Gamma_i^0$ that is set at the initial period of calculation.

That is, an ion scattering flux ($\Gamma_i^{s'}$) and a direct incident flux ($\Gamma_i^{d'}$) that are finally obtained by normalization become as the following formulas (7) and (8).

$$\Gamma_i^{s'} = \frac{\Gamma_i^s}{\Gamma_i^s + \Gamma_i^d}\Gamma_i^0 \quad (7)$$

$$\Gamma_i^{d'} = \frac{\Gamma_i^d}{\Gamma_i^s + \Gamma_i^d}\Gamma_i^0 \quad (8)$$

The calculation method is different from the method of calculating incident propagation of ions in the direction from the sheath region to the workpiece that used to be used for the semiconductor process shape simulation in the past.

The calculation method is to reversely trace a flight trajectory of ions based on the flux method, taking an arbitrary position on a surface of the workpiece (for example, a center of gravity of the voxels that exists at the corresponding position) as a starting point, and taking the flux incident on that position as the flight trajectory of ions.

In a case that a flux is taken as the flight trajectory of ions, consideration is given in carrying out reverse trace to the path of ions, the variation in physical quantity (for example, kinetic energy) of ions considering the surface reaction effect at the time of scattering, the reradiation angle, and the effective range of reverse trace referring to the angular limitation of IADF.

Then, since the calculation method reversely traces the flight trajectory of ions to consider the effective range of reverse trace, it is possible to reduce the calculation load and to accelerate the calculation (up to N order in two dimensions and up to $N^2$ order in three dimensions).

According to an embodiment in the present disclosure, similarly to the calculation method, a flux is reversely traced to consider the effective range of the reverse trace from the comparison with the angular range of the flux, so that it is possible to reduce the calculation load and to accelerate the calculation (up to N order in two dimensions and up to $N^2$ order in three dimensions).

2. First Embodiment (Simulator)

Figure 5:
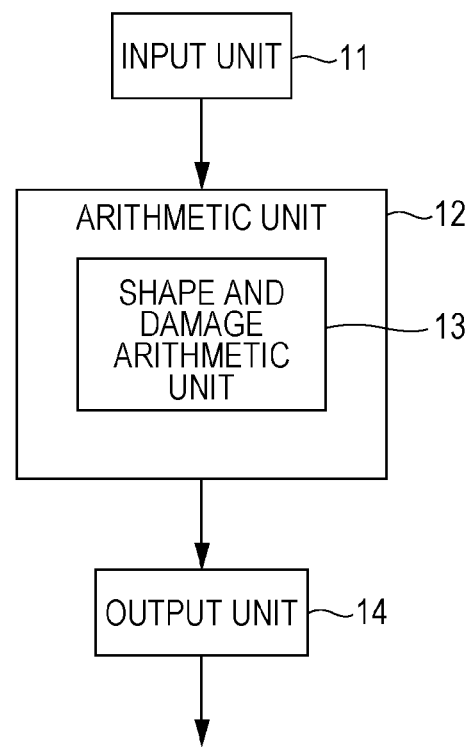
FIG. 5 is a block diagram of a simulator of a first embodiment.

FIG. 5 illustrates a schematic configuration diagram (block diagram) of a simulator of a first embodiment.

The simulator illustrated in FIG. 5 is provided with an input unit 11, an arithmetic unit 12, and an output unit 14.

The input unit 11 is to obtain processing conditions in carrying out predetermined processing treatment to a workpiece to input to the arithmetic unit 12.

The arithmetic unit 12 has a shape and damage arithmetic unit 13.

In the shape and damage arithmetic unit 13, based on the processing conditions inputted via the input unit 11, calculation of shape development and damage of the workpiece using simulation in the calculation method, for example, illustrated in FIG. 1 is carried out.

In the present embodiment, the calculation process may be achieved by configuring the shape and damage arithmetic unit 13 with hardware while the calculation process may also be executed using a predetermined simulation program (software).

In a case of using the predetermined simulation program, the shape and damage arithmetic unit 13 is configured with an operation device, such as a central processing unit (CPU), for example. Then, the simulation program is loaded from outside and the loaded program is executed, thereby executing the calculation process.

The simulation program may be stored in, for example, a database not illustrated or in a storage unit separately equipped, such as a read only memory (ROM), for example. Then, the simulation program may also have a configuration of being implemented in advance in, for example, a database or a storage unit separately equipped, and may also have a configuration of being obtained from outside to be implemented in, for example, a database or a storage unit separately equipped. In a case of obtaining a simulation program from outside, the simulation program may be distributed from a medium, such as an optical disc and a semiconductor memory, and may also be downloaded via a transmission system, such as the Internet.

The output unit 14 outputs a result of simulation for the predetermined processing treatment calculated by the arithmetic unit 12. The output unit 14 may also output information, such as the processing treatment conditions and the parameters used for the operation, for example, together with the result of simulation for processing treatment.

The output unit 14 is configured by one type of, or appropriately combining two or more types of devices, such as a display device to display the result of simulation, a printing device to print and output the result of simulation, and a recording device to record the result of simulation, for example.

In the present embodiment, a configuration where the simulator is provided with the output unit 14 is described while it is also possible to have a configuration where an output unit is equipped outside the simulator in an embodiment of the present disclosure.

Further, the simulator may also be provided with a database unit to memorize various parameters desirable for calculation process in the shape and damage arithmetic unit 13. Alternatively, such a database unit may also be equipped outside the simulator.

In a case of inputting various parameters desirable for the calculation process from outside at any time, the database unit may not be equipped.

3. Second Embodiment (Calculation of Ion Scattering Flux)

Next, as a second embodiment, calculation of ion scattering flux in a case of applying an embodiment in the present disclosure to specific processing treatment is described.

In the present embodiment, an ion scattering flux in a case of carrying out etching of a two dimensional contact hole of $SiO_2$ film by a capacitively coupled plasma (CCP) dry etching device is calculated.

Figure 6:
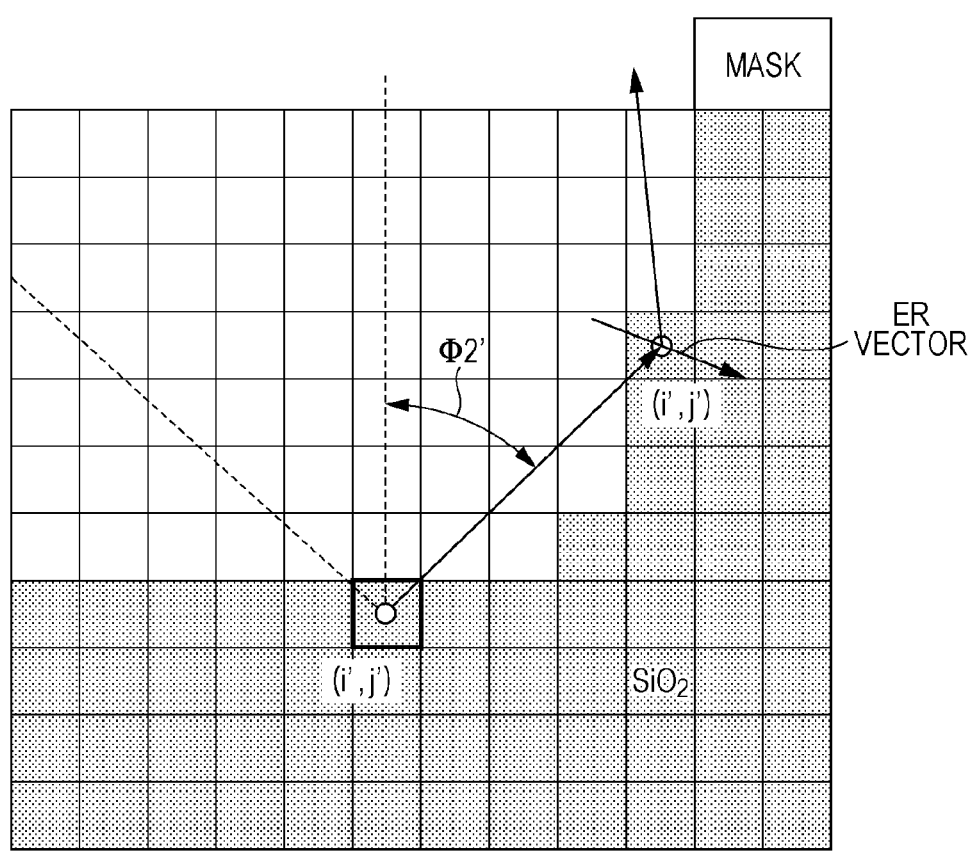
FIG. 6 illustrates calculation of an ion scattering flux of a second embodiment (a cross-sectional view illustrating a procedure of reverse tracing an ion incident on one voxel)

The second embodiment is described referring to FIG. 6.

FIG. 6 illustrates a state during the course of forming a mask pattern on a $SiO_2$ film and of processing the $SiO_2$ film in the area not covered with the mask by etching to form a contact hole.

The whole is divided into square voxels, and FIG. 6 illustrates a procedure of reversely tracing an ion incident on one voxel on the bottom surface of the hole as a cross-sectional view.

In the present embodiment, a contact hole is assumed to have a hole diameter of 200 nm, a voxel is supposed to have a size of 3 nm×3 nm, and etching is assumed to be under the following process conditions to carry out calculation of a flux in ion scattering.

Process Conditions:

Gaseous species and flow rate: $C_4F_8/O_2/Ar=11/8/400$ sccm

Pressure: 30 mTorr

Vpp=1450 V

Wafer temperature: 30° C.

At this time, gas flux data in the chamber is obtained by plasma monitoring using optical emission spectroscopy (OES), quadrupole mass spectroscopy (QMS), and infrared-diode laser absorption spectroscopy (IRLAS). Then, using the gas flux data in the chamber and the above process conditions, a normal vector (ER vector) in the two-dimensional space is derived from a flux vector at the immediately previous time step of ions and radicals incident on voxels on the bottom portion and the side walls of the hole.

Examples of the ion incident on the voxels may include $CF^+$, $CF_3^+$, $CF_2^+$, $C_2F_4^+$, $F^+$, and $Ar^+$.

Examples of the radicals incident on the voxels may include $CF_2$, CF, F, $CF_3$, and O.

Figure 7:
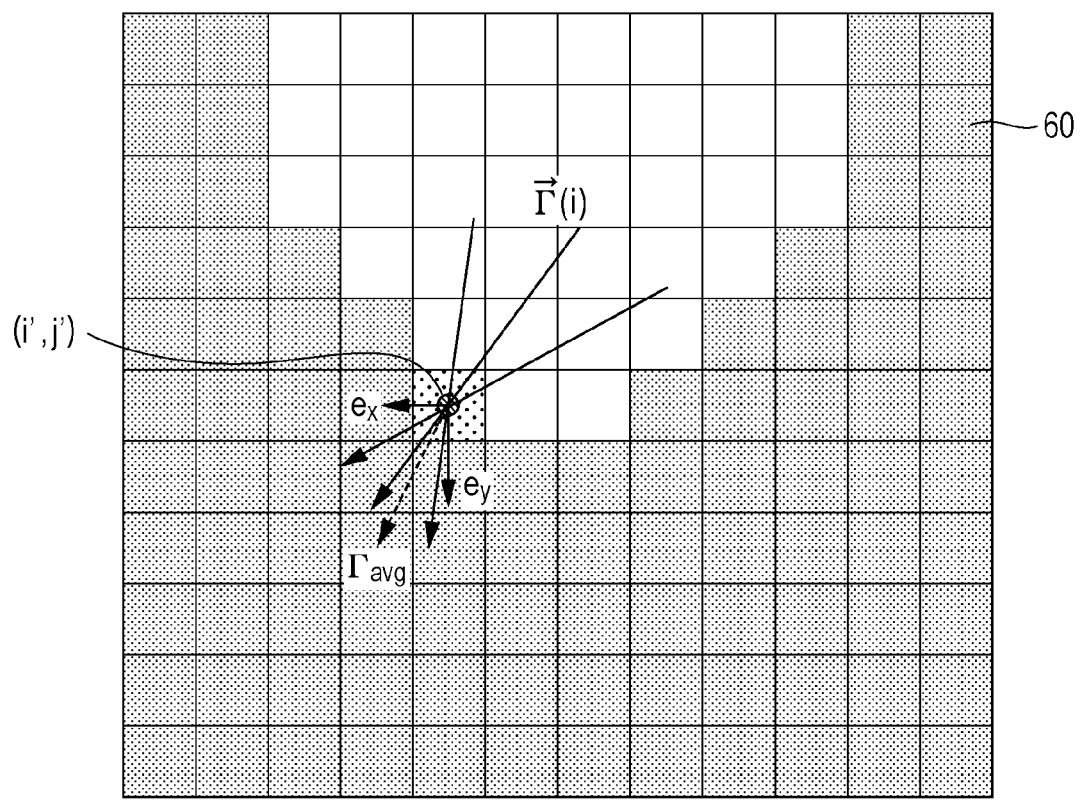
FIG. 7 illustrates one example of a calculation model to calculate a normal vector.
Figure 8:
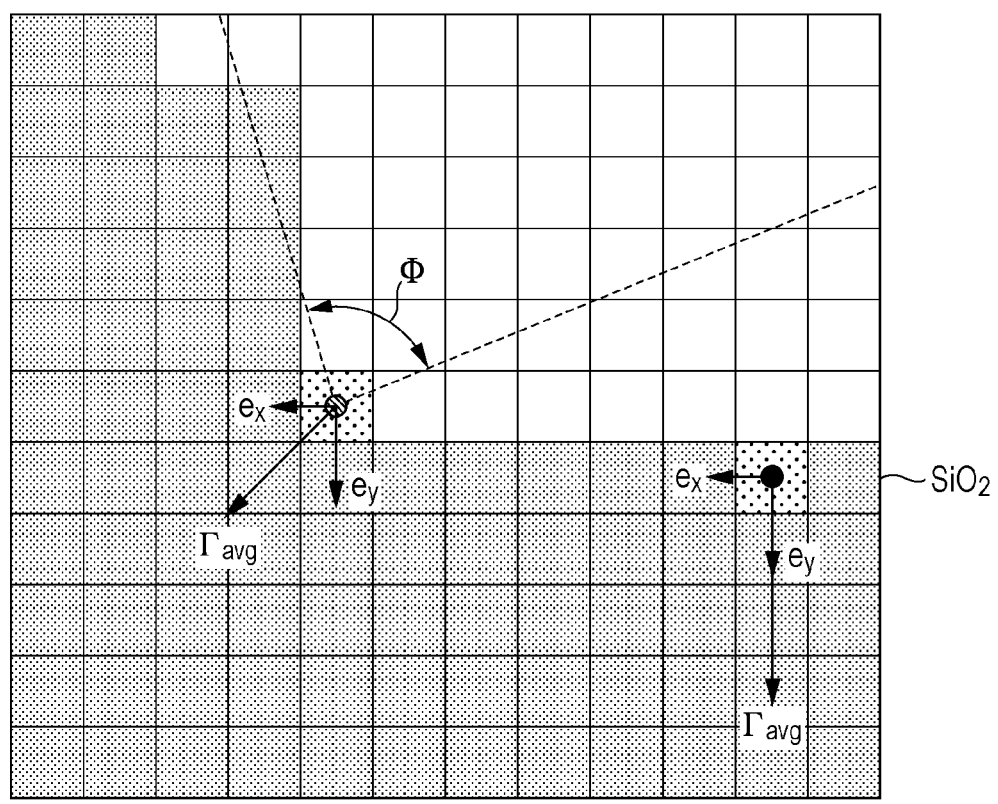
FIG. 8 illustrates an example of calculating a normal vector in a certain voxel.

Here, a method of deriving a normal vector is described referring to FIGS. 7 and 8.

FIG. 7 illustrates one example of a calculation model to calculate a normal vector, and FIG. 8 illustrates an example of calculating a normal vector in a certain voxel.

As one example of a calculation model to calculate a normal vector, as illustrated in FIG. 7, in a case of focusing on a certain voxel that is arranged on the surface of a workpiece 60, consideration is given to a flux incident on a center of gravity (i, j) of that voxel. Here, consideration may be given only to a flux component directly incident from immediately above the pattern, and in addition to that, consideration may also be given to, for example, a flux component that is reemitted from the pattern side walls to be indirectly incident.

A flux vector $\Gamma(i)$ that is incident in a certain angular direction i is split into directions of unit vector components $e_x$ and $e_y$ (unit vector components $e_x$, $e_y$, and $e_z$ in a case of the three dimensions) perpendicular to each other as illustrated in FIG. 7. A similar operation is performed for each certain angle step to a flux that is incident from another angular direction to respectively sum up for each $e_x$ component and $e_y$ component.

Lastly, as expressed in the formula (9), linear composition of flux components in the $e_x$ direction and the $e_y$ direction is carried out to define the direction of composition vector $\Gamma_{avg}$ as a normal direction to be a normal vector. In addition, the absolute value $|\Gamma_{avg}|$ of the normal vector is to be a total flux content to that voxel.

$$\vec{\Gamma}_{avg} = \sum_i \vec{\Gamma}(i) = \left( \sum_i [\vec{\Gamma}(i) \cdot \vec{e}_x] \sum_i [\vec{\Gamma}(i) \cdot \vec{e}_y] \right) \quad (9)$$

FIG. 7 illustrates a case of the general workpiece 60 while FIG. 8 illustrates application to a case that the workpiece is a $SiO_2$ film as in FIG. 6. In FIG. 8, the normal vector $\vec{\Gamma}_{avg}$ is derived from a focused voxel in a range Φ expecting the pattern frontage.

The normal vector derived as illustrated in FIG. 8 coincides with the normal vector (derived from positional information of two adjacent grid points) obtained by a two dimensional string model.

Using the normal vector derived from the method described above, a surface reaction model considering the depth direction (for example, a surface reaction model described in N. Kuboi, T. Tatsumi, S. Kobayashi, J. Komachi, M. Fukasawa, T. Kinoshita, and H. Ansai: "Numerical Simulation Method for Plasma-Induced Damage Profile in $SiO_2$ Etching", Japanese journal of applied physics: JJAP 50(11), 116501-1-9, 2011-11, although not limited to this model) is solved, thereby enabling calculation of the reaction rate (etch rate) and the damage.

In a case of focusing on one voxel (i, j) illustrated in FIG. 6, the range of Φ2' is [58°, 62°]. In this angular range and the step of dΦ2'=1°, calculation is carried out in accordance with the calculation flow illustrated in FIG. 1.

Where flux calculation is also carried out for other voxels in a similar manner, the final ion scattering flux is up to 10% of the ion direct incident flux.

4. Third Embodiment (Shape Simulation)

Next, as a third embodiment, one mode of shape simulation taking an ion scattering effect into consideration is described.

Figure 9:
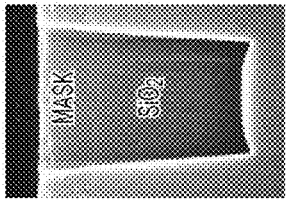
FIG. 9 illustrates a structural example where an ion scattering effect is calculated in a third embodiment.

FIG. 9 illustrates shape simulation according to the third embodiment.

FIG. 9 illustrates a cross-sectional structure observed by a scanning electron microscope (SEM) after actually carrying out etching and a cross-sectional structure obtained as a result of carrying out simulation according to an embodiment in the present disclosure, respectively for two pattern structures. For results of simulation, respective cross-sectional structures are illustrated for a case of not considering ion scattering and a case of taking ion scattering into consideration.

To a resist mask initial pattern having a hole diameter of 200 nm and 900 nm and having a film thickness of 400 nm, shape simulation after processing is carried out using process conditions similar to the second embodiment (however, the etching time is 160 seconds).

In the shape simulation of the present embodiment, using the normal line and the flux content in the normal direction that are obtained in the second embodiment, and using a surface reaction model considering the depth direction, the film thickness and the etch rate of a reaction deposition at each voxel are calculated to calculate the shape development. The flux content in the normal direction includes scattering and direct incidence of ions and direct incidence and indirect incidence of radicals. Examples of surface reaction model may include, for example, a model illustrated in Japanese Unexamined Patent Application Publication No. 2012-134271 (FIGS. 2, 3, and the like), and in the present embodiment, the model illustrated in that publication is used.

As seen from FIG. 9, in any of the two pattern structures, by incorporating the scattering effect of ions obtained by the calculation as the second embodiment, it is possible to reproduce the processing depth and the microtrench structure that are observed by a cross-sectional SEM more accurately.

5. Fourth Embodiment (Damage Simulation)

Next, as a fourth embodiment, one mode of damage simulation taking an ion scattering effect into consideration is described.

Figure 10:
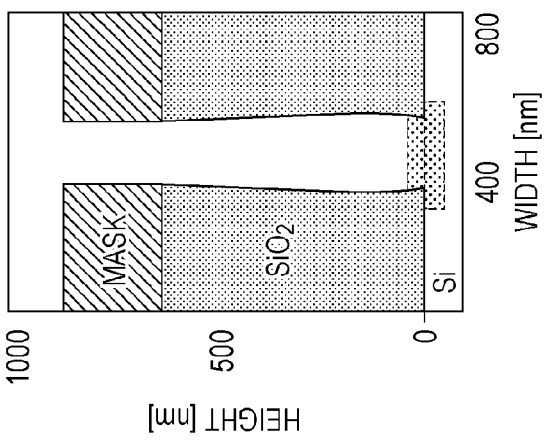
FIG. 10 is a cross-sectional view of a structure where calculation is carried out in a fourth embodiment.
Figure 11:
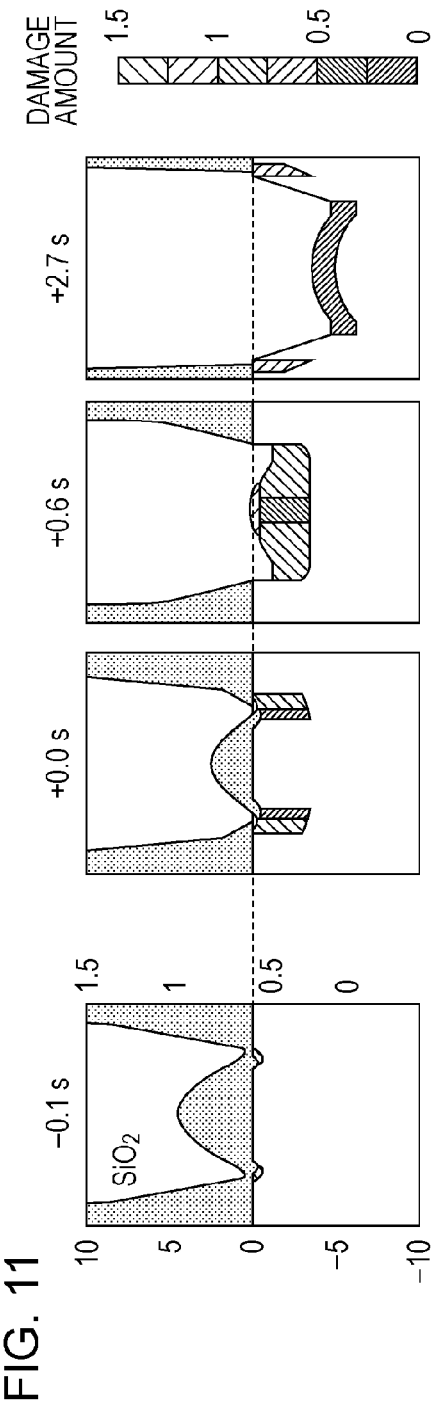
FIG. 11 illustrates an example of calculating a shape after etching regarding the structure in FIG. 10.

Descriptions are given to the fourth embodiment referring to FIGS. 10 through 11.

In the present embodiment, on the assumption of processing of a $SiO_2$ contact hole in the process conditions of the second embodiment, damage distribution produced in a base silicon substrate is also calculated in addition to the shape development calculation in a calculation approach similar to the third embodiment.

FIG. 10 illustrates a cross-sectional view of the structure subject to the calculation.

As illustrated in FIG. 10, on a $SiO_2$ layer formed on a silicon substrate, a contact hole reaching the silicon substrate is formed by etching using a mask.

Assuming that the contact hole has a diameter of 200 nm and an aspect ratio of 3.5, simulation is carried out by shape development calculation in a calculation approach similar to the third embodiment.

FIG. 11 illustrates results of simulation at respective timing with elapsed time in the enlargement of a surface region in a lower portion of the contact hole illustrated in FIG. 10. In FIG. 11, before +0.0 s is equivalent to main etching and after +0.0 s is equivalent to over etch.

FIG. 11 is a calculation result of taking the ion scattering effect into consideration, and it is understood that simulation is performed on the situation of forming a damage from an edge region of the hole in the base silicon substrate under the influence of the microtrench structure caused by ion scattering.

6. Fifth Embodiment (Simulation Software)

Next, as a fifth embodiment, one mode of simulation software (program) according to an embodiment in the present disclosure is described.

Figure 12:
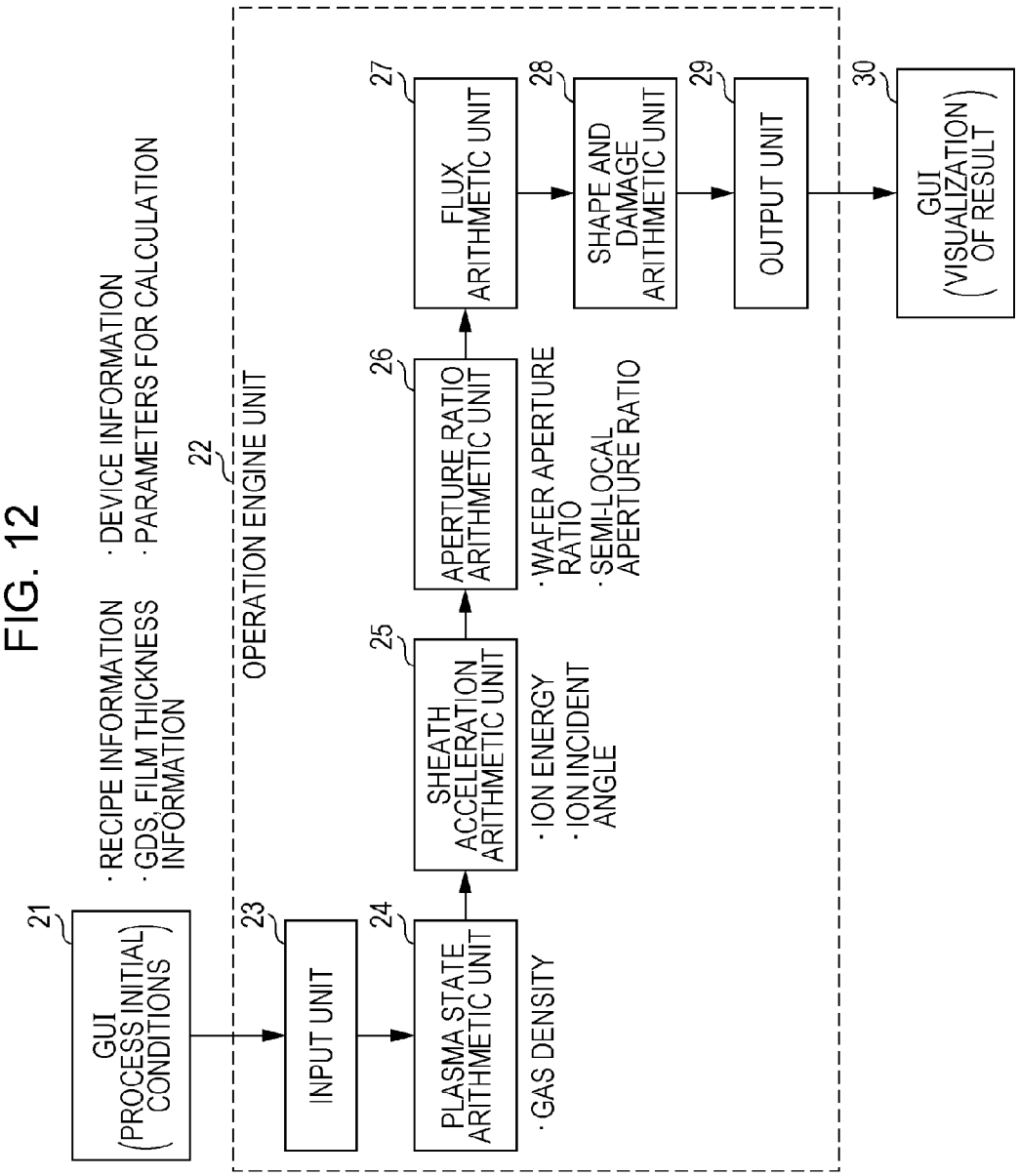
FIG. 12 is a conceptual diagram of simulation software (program) of a fifth embodiment.

FIG. 12 illustrates a conceptual diagram of simulation software (program) of the fifth embodiment.

The simulation software (program) in the present embodiment is a specific example of simulation software (program) to which the simulation method (calculation of ion scattering flux) of the second embodiment is applied.

The simulation software is provided with a graphical user interface (GUI) 21 to input initial conditions, an operation engine unit 22, and a GUI 30 to visualize a result of simulation.

The operation engine unit 22 is configured by respective modules of an input unit 23, a plasma state arithmetic unit 24, a sheath acceleration arithmetic unit 25, an aperture ratio arithmetic unit 26, a flux arithmetic unit 27, a shape and damage arithmetic unit 28, and an output unit 29.

The input unit 23 is equipped to deliver values of the initial conditions to the operation engine unit 22.

A platform for execution of the simulation software may be any of, for example, Windows®, Linux®, Unix®, or Mac®. The GUIs 21 and 30 may have any configuration language, such as OpenGL, Motif, and tcl/tk. The operation engine unit 22 may have any type of programming language, such as C, C++, Fortran, and JAVA®.

From the GUI 21, as the initial conditions, recipe information, device information, parameters for calculation, graphic design system (GDS) data, and film thickness information are inputted.

In the plasma state arithmetic unit 24, the density of each gaseous species (ions and radicals) in the bulk plasma on the basis of initial conditions is calculated.

In the sheath acceleration arithmetic unit 25, the energy distribution of ions in the final state (IEDF), where the ions generated in the bulk plasma are accelerated in a sheath (including collision with radicals), and the incident angular distribution IADF to the pattern are calculated. For these distributions, a database obtained by actual measurement or the like may also be used.

In the aperture ratio arithmetic unit 26, from the GDS data and the film thickness information, influence of a wafer aperture ratio (an aperture ratio of a mask in the wafer) and a semi-local aperture ratio (an aperture ratio of a mask at a chip level) on the flux (in linear relationship with each other) is calculated.

In the flux arithmetic unit 27, from the incident flux of ions and radicals, the flux is calculated in accordance with the calculation flow illustrated in FIG. 1.

In the shape and damage arithmetic unit 28, using the flux calculated in the flux arithmetic unit 27, shape and damage distribution is calculated.

After finishing the calculation, results of positional information of the voxel (process shape information, such as a line width, a taper, and a mask residue film), damage distribution, a film thickness of a reaction deposition (polymer, oxide) are outputted from the output unit 29 to a file.

It is also possible to carry out visualization of these results by the GUI 30.

There is no problem of carrying out the output and visualization of data in real time during the calculation.

7. Sixth Embodiment (Semiconductor Processing Equipment)

Next, as a sixth embodiment, one mode of semiconductor processing equipment according to an embodiment in the present disclosure is described.

Figure 13:
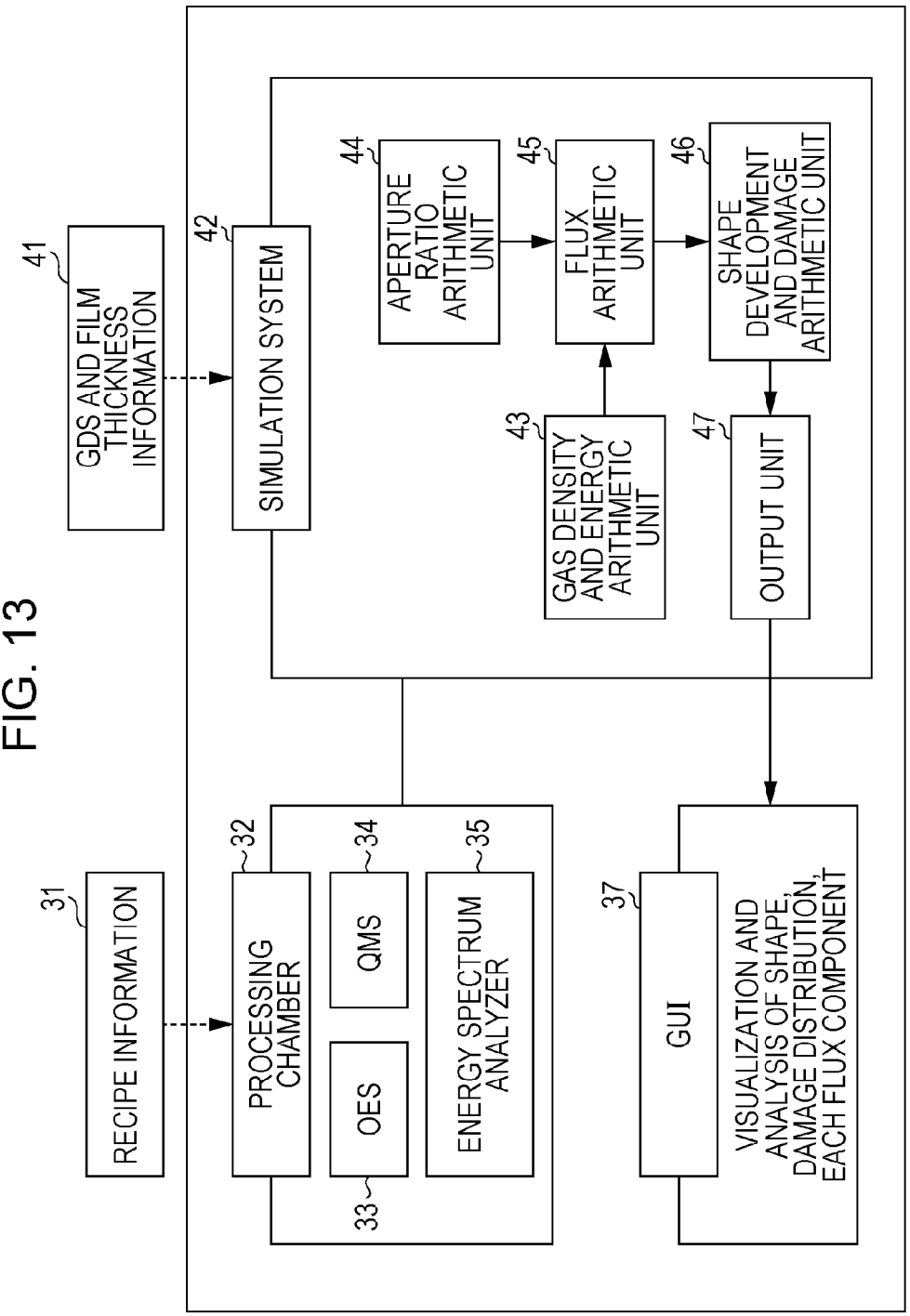
FIG. 13 is a conceptual diagram of semiconductor processing equipment of a sixth embodiment.

FIG. 13 illustrates a conceptual diagram of semiconductor processing equipment of the sixth embodiment.

The semiconductor processing equipment is configured by a processing chamber 32, a simulation system 42, and a visualization system 37 (GUI 37).

The processing chamber 32 is a CCP. It is to be noted that it may also have other plasma generation mechanisms, such as inductively coupled plasma (ICP) and electron cyclotron resonance (ECR) types.

The simulation system 42 includes a gas density and ion energy arithmetic unit 43, an aperture ratio arithmetic unit 44, a flux arithmetic unit 45, a shape and damage arithmetic unit 46, and an output unit 47.

The shape and damage arithmetic unit 46 further includes, though not illustrated, a flux module, a voxel size optimization module, a normal line module, an etch rate and damage module, a shape development module, and a damage allocation module that include the approach of an embodiment in the present disclosure.

The voxel size optimization module optimizes a voxel size that is used for simulation. For example, a surface reaction model considering the depth direction is solved using the initial flux and the normal vector on the surface, thereby calculating the reaction rate at t=0 for optimization of the voxel size.

The normal line module is a module to carry out calculation of the normal vector as the above description for FIG. 7.

The etch rate and damage module is a module to carry out damage calculation using a model, such as the surface reaction model mentioned in Japanese Unexamined Patent Application Publication No. 2012-134271.

The shape development module develops a shape using the derived reaction rate.

The damage allocation module allocates damage to each voxel based on the normal vector using the normal vector and the damage that are calculated.

In the processing chamber 32, an OES 33, a QMS 34, and an energy spectrum analyzer 35 to obtain input data for the simulation are implemented, thereby monitoring plasma all the time during processing.

The sampling rate is, for example, 0.1 seconds.

The information obtained by them during the processing and further recipe information 31 is sent to the simulation system 42 for calculation of the gas density and the ion energy.

Further, using GDS and film thickness information 41, taking the contribution of the wafer aperture ratio and the semi-local aperture ratio to the flux (in linear relationship with each other) calculated in the aperture ratio arithmetic unit 44 into consideration, calculation is carried out in accordance with the calculation flow in FIG. 1.

This process is repeated sequentially during the processing, and it is possible to carry out actual processing while confirming prediction for change in shape and damage distribution in real time by the visualization system using the GUI 37.

8. Seventh Embodiment (Semiconductor Processing Equipment)

Next, as a seventh embodiment, another mode of semiconductor processing equipment according to an embodiment in the present disclosure is described.

Figure 14:
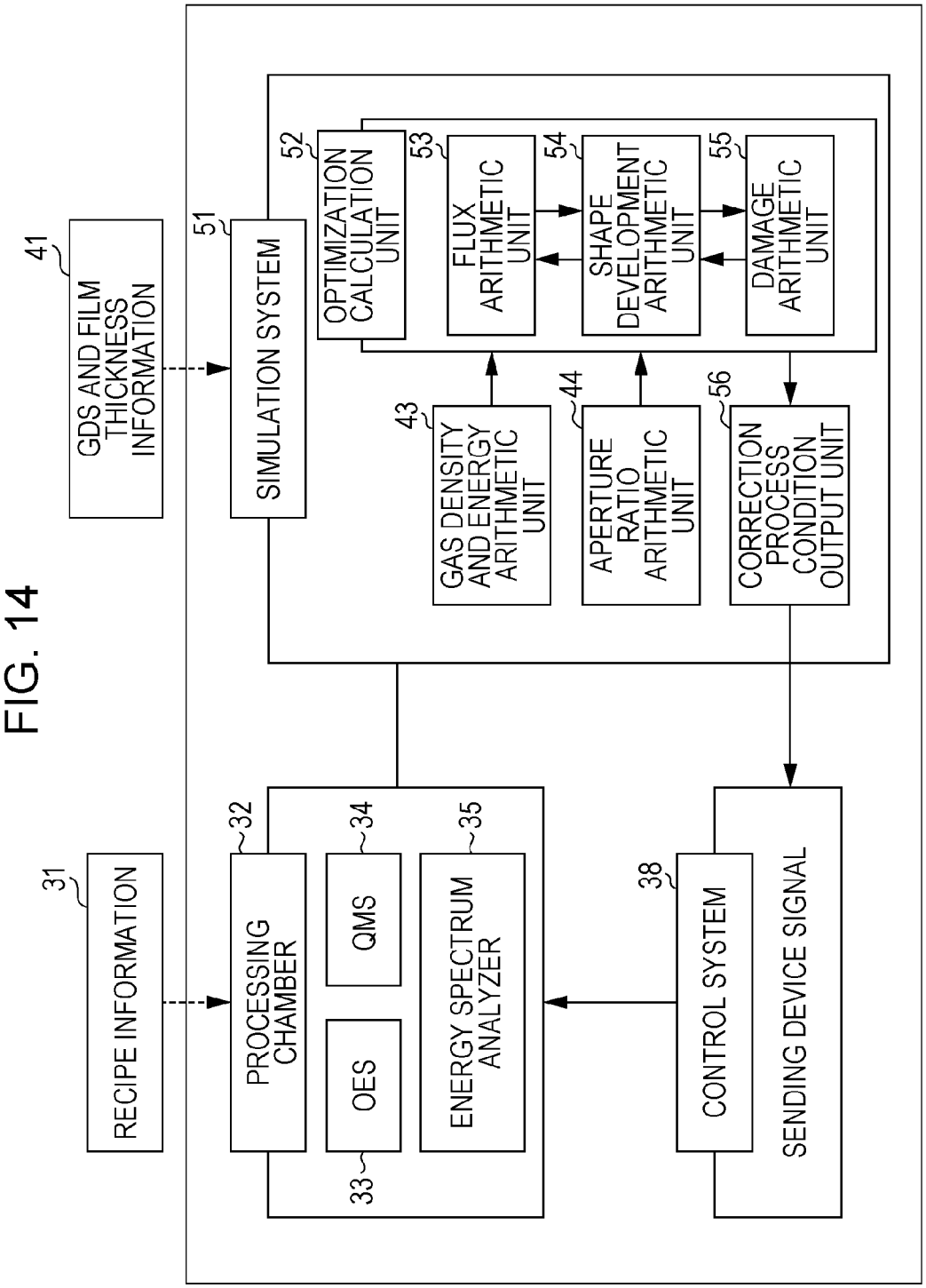
FIG. 14 is a conceptual diagram of semiconductor processing equipment of a seventh embodiment.

FIG. 14 illustrates a conceptual diagram of semiconductor processing equipment of the seventh embodiment.

The semiconductor processing equipment is configured by the processing chamber 32, a simulation system 51, a control system 38, and a fault detection and classification/equipment engineering system (FDC/EES), not illustrated. Although the processing chamber 32 is a CCP, it may also have other plasma generation mechanisms, such as ICP and ECR types.

In the processing chamber 32, the OES 33, the QMS 34, and the energy spectrum analyzer 35 to obtain input data for the simulation are implemented, thereby monitoring plasma all the time during processing.

The sampling rate is, for example, 0.1 seconds.

The information obtained by them during the processing and further recipe information is sent to the simulation system 51 for calculation of the gas density and the ion energy.

The simulation system 51 includes a gas density and energy arithmetic unit 43, an aperture ratio arithmetic unit 44, an optimization calculation unit 52, a flux arithmetic unit 53, a shape development arithmetic unit 54, a damage arithmetic unit 55, a correction process condition output unit 56. The flux arithmetic unit 53 may include suitable logic, circuitry, interfaces, and/or code that may perform functions similar to the flux arithmetic unit 27 described in FIG. 12. The shape development arithmetic unit 54 performs functions similar to shape development module of the shape development and damage arithmetic unit 46 of FIG. 13. The damage arithmetic unit 55 performs functions similar to damage calculation module of the shape development and damage arithmetic unit 46 of FIG. 13.

When the calculation time is sufficiently less than actual processing time, all may also be obtained by reactor simulation.

Further, using GDS and film thickness information 41, taking the contribution of the wafer aperture ratio and the semi-local aperture ratio to the flux (in linear relationship with each other) calculated in the aperture ratio arithmetic unit 44 into consideration, the flux, the etch rate, and the damage distribution are calculated by the calculation flow in FIG. 1. For example, as a model to derive the etch rate and damage, it is possible to use the model described in Japanese Unexamined Patent Application Publication No. 2012-134271.

In a case that the shape and the damage are out of desired specifications, process parameters are shifted for, for example, ±50% (this determination condition value is parameterized) to carry out the calculation illustrated in FIG. 1, thereby finding out correction conditions to meet the desired specifications.

Examples of a case of being out of the desired specifications may include, for example, a case that a line width variable value is ±10% or more of the desired 70 nm and a damage amount is increased by 50% of the desired $10^{11}$ cm$^2$.

For the process parameters, values are given in the order of, for example, a gas flow rate, a gas pressure, application power, and a wafer temperature to carry out the calculation illustrated in FIG. 1.

The correction conditions thus obtained are delivered to the control system 38 to modify the corresponding parameters in the processing chamber 32 for continuous processing.

In a case that no solution to satisfy the desired specifications is found in the simulation, an alert signal is sent to the FDC/FES system to stop the device.

Regarding an optimization calculation part of the simulation system 51, in a case that the calculation time is a scale equivalent to the actual processing time or more, it is not limited to the method of finding out the optimal solution by carrying out calculation of shapes and damages online as above. For example, there is no problem of a method of searching and interpolating by creating a database of shapes and damages in advance for various process conditions to utilize the database.

9. Eighth Embodiment (Method of Manufacturing a Semiconductor Device)

Next, as an eighth embodiment, one mode of a method of manufacturing a semiconductor device according to an embodiment in the present disclosure is described.

Figure 15:
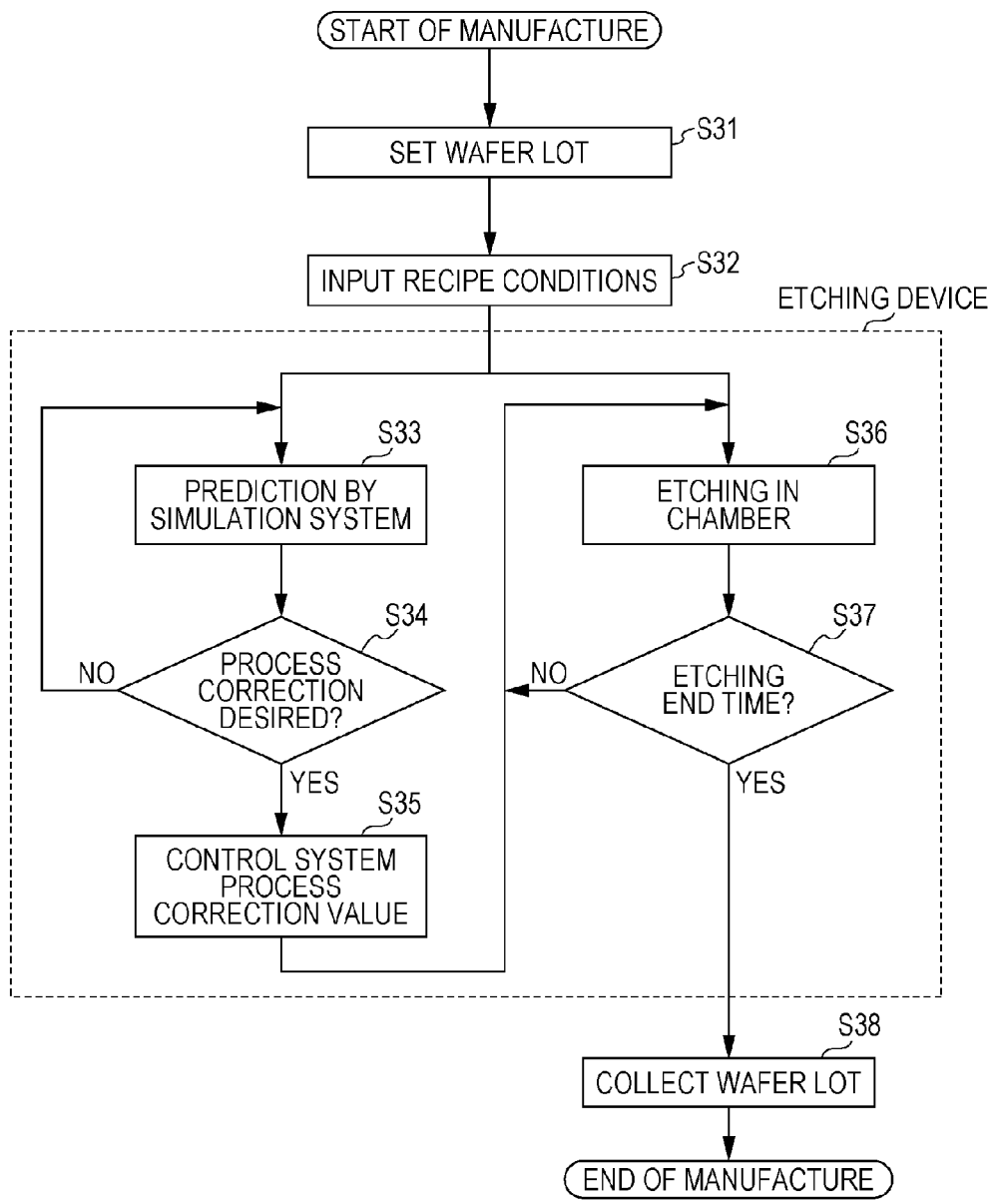
FIG. 15 is a conceptual diagram (flowchart) of a method of manufacturing a semiconductor device of an eighth embodiment.

FIG. 15 illustrates a conceptual diagram (flowchart) of a method of manufacturing a semiconductor device of the eighth embodiment.

The method of manufacturing a semiconductor device in the present embodiment carries out prediction by a simulation system in parallel with execution of etching in an etching device to determine whether or not correction of process conditions is desired, and in a case that correction is desired, modification of process conditions is carried out. Then, due to the process conditions after modification, execution of etching is continued.

The etching device used in the present embodiment is a plasma etching device described in the seventh embodiment in which the process control system and the simulation system are implemented.

As illustrated in FIG. 15, firstly, in step S31, a wafer lot is set in an etching device.

Next, in step S32, recipe conditions are inputted.

Next, in the etching device, prediction by a simulation system in step S33 and etching in a chamber in step S36 are carried out in parallel.

In the simulation system, subsequently the procedure goes on to step S34 to determine whether or not process (process conditions) has to be corrected.

As a result of the determination, in a case that the process does not have to be corrected, the procedure goes back to step S33 to proceed with prediction. As a result of the determination, in a case that the process has to be corrected, the procedure goes on to step S35 to obtain a process correction value in the control system.

Then, correction of the process conditions is carried out based on the process correction value thus obtained to proceed with etching in the chamber in the corrected process conditions in step S36.

Next, in step S37, whether or not it reaches an etching end time is determined. In a case that it does not reach the end time, the procedure goes back to step S36 to proceed with etching. In a case that it reaches the end time, the operation in the etching device is finished and the procedure goes on to step S38.

Next, in step S38, the wafer lot is collected to finish the manufacture.

The processing step of the manufacturing method in the present embodiment is processing of a polysilicon gate (having a polysilicon film thickness of 150 nm) and the following conditions are used for recipe conditions (processing conditions) to be inputted.

Wafer aperture ratio: 80%
(BARC Etching Step)
$Cl_2$ gas: 20 sccm
$O_2$ gas: 20 sccm
Source power: 200 W
Bias power: 70 W
Pressure: 20 mTorr
Lower electrode temperature: 55° C.
(Polysilicon Etching Step)
HBr gas: 150 sccm
$O_2$ gas: 2 sccm
Source power: 200 W
Bias power: 100 W
Pressure: 15 mTorr
Lower electrode temperature: 55° C.

The wafer lot is set, and while carrying out shape correction by the simulation system, plasma etching is carried out in the chamber, thereby making it possible to obtain the desired gate line width accuracy.

It is possible to apply embodiments in the present disclosure to processing and manufacture of various semiconductor devices.

In addition, it is possible to apply embodiments in the present disclosure to cases of carrying out predetermined processing treatment to a workpiece including an organic material or an inorganic material, not limited to the processing and the manufacture of semiconductor devices.

Furthermore, in various electronic devices provided with a semiconductor device, it is possible to adapt an embodiment in the present disclosure to the step of manufacturing a semiconductor device of the electronic devices.

In each of the above embodiments, a case of carrying out etching by emitting ions to a workpiece is described.

In embodiments of the present disclosure, the flux to be emitted to a workpiece is not limited to ions but it is also possible to have a configuration of emitting other particles, such as radicals, or ultraviolet rays as the flux to a workpiece.

10. Ninth Embodiment (Electronic Device)

Next, an electronic device of a ninth embodiment is described.

Figure 16:
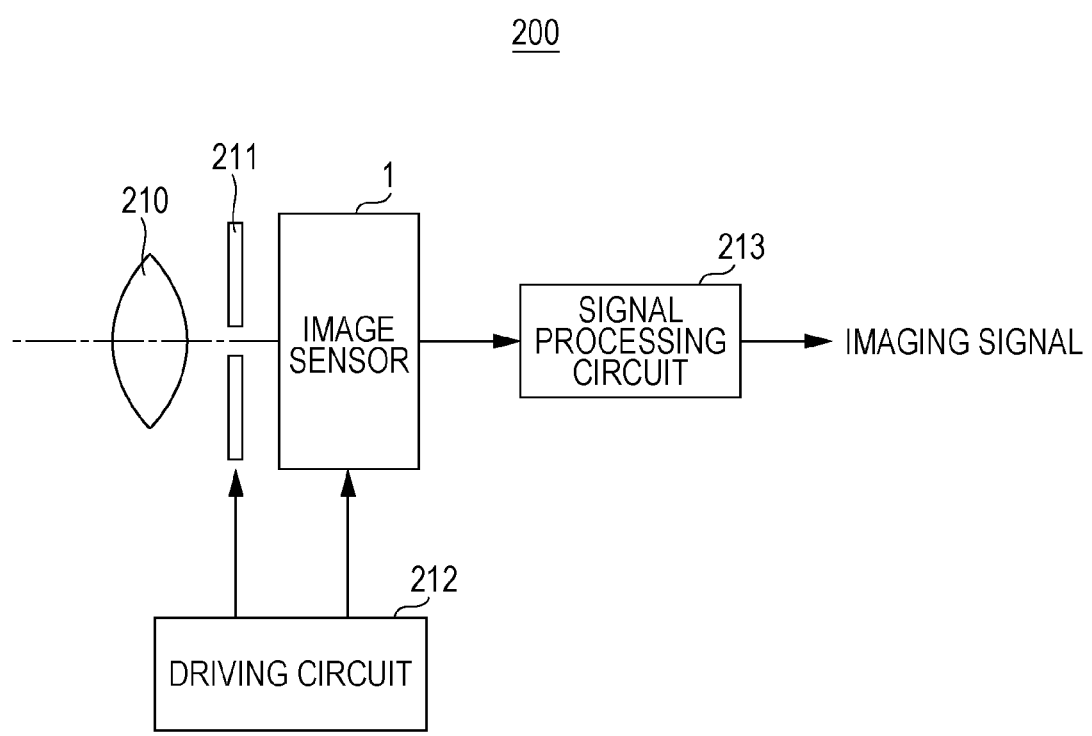
FIG. 16 is a schematic configuration diagram (block diagram) of an electronic device of a ninth embodiment.

FIG. 16 illustrates a schematic configuration diagram (block diagram) of an electronic device of the ninth embodiment.

As illustrated in FIG. 16, an electronic device 200 in the present embodiment has an image sensor 1, an optical system 210, a shutter device 211, a driving circuit 212, and a signal processing circuit 213.

To manufacture (etching step part) of the image sensor 1, the manufacturing method of the eighth embodiment is applied.

The optical system (optical lens) 210 forms image light (incident light) from the subject as an image on the imaging surface of the image sensor 1. This causes signal charge to be accumulated in the image sensor 1 for a certain period of time. The optical system 210 may also be an optical lens system that is configured by a plurality of optical lenses.

The shutter device 211 controls a period of emitting light and a period of blocking light to the image sensor 1.

The driving circuit 212 supplies a driving signal to control a transfer behavior of the image sensor 1 and a shutter behavior of the shutter device 211. By the driving signal (timing signal) supplied from the driving circuit 212, signal transfer of the image sensor 1 is carried out.

The signal processing circuit 213 carries out various types of signal processing. A signal processed video signal is stored in a storage medium, such as a memory, or outputted to a monitor.

The electronic device 200 provided with the image sensor 1 is not limited to video cameras that are capable of taking a still image or a motion image but is applicable to imaging devices, such as a digital still camera and camera modules for mobile devices like portable phones.

Embodiments of the present disclosure may have the following configurations.

(1) A simulation method to carry out, by an information processing device, calculation including:

reversely tracing a first flux incident on an arbitrary position on a surface of a workpiece subject to predetermined processing treatment from the arbitrary position;

in a case that the first flux strikes another position on the surface of the workpiece as a result of the reverse tracing of the first flux, calculating a second flux to be the first flux by scattering at the another position and reversely tracing the second flux from the another position; and, by repeating the calculation and the reverse tracing of flux, when the reversely traced flux no longer strikes the surface of the workpiece, carrying out comparison of the flux with an angular distribution of a flux incident on the workpiece, and when the current flux is within the angular distribution, obtaining an amount of flux that has contributed to the scattering for a flux group from the first flux to the current flux.

(2) The simulation method according to (1), wherein the surface of the workpiece is expressed using a voxel model including a plurality of voxels, and the arbitrary position and the another position are at positions of center of gravity of the voxels.

(3) The simulation method according to (1), wherein the surface of the workpiece is expressed using a string model including a plurality of grid points, and the arbitrary position and the another position are at positions of the grid points.

(4) The simulation method according to any one of (1) through (3), wherein, in reversely tracing the flux, a tracing trajectory is a curved line taking an action to the flux into consideration.

(5) The simulation method according to any one of (1) through (4), wherein, in calculating the second flux from the first flux, the second flux is calculated depending on an angle that is made by a normal vector on a surface of the another position and the first flux.

(6) The simulation method according to any one of (1) through (5), wherein, in calculating the second flux from the first flux, an energy loss of the flux is taken into consideration depending on a film thickness of a deposited film that exists on a surface of the another position.

(7) The simulation method according to any one of (1) through (6), wherein, in calculating the second flux from the first flux, energy is distributed depending on a mass of particles of the incident flux and a mass of atoms constituting a film on a surface of the another position.

(8) The simulation method according to any one of (1) through (7), wherein the scattering is specular scattering or is specular scattering taking angular variation into consideration.

(9) The simulation method according to any one of (1) through (8), wherein angular distribution of the flux is obtained using at least any of an analytic formula, a result of sheath simulation, or a database based on actual measurement.

(10) The simulation method according to any one of (1) through (9), further including calculating an etch rate by obtaining an ion scattering flux and by solving a surface reaction using the ion scattering flux.

(11) The simulation method according to (10), further including calculating shape development and/or damage, or crystal defect, distribution using the calculated etch rate.

(12) A simulation program to be executed by implementing processes to an information processing device, the processes including:

reversely tracing a first flux incident on an arbitrary position on a surface of a workpiece subject to predetermined processing treatment from the arbitrary position;

in a case that the first flux strikes another position on the surface of the workpiece as a result of the reverse tracing of the first flux, calculating a second flux to be the first flux by scattering at the another position and reversely tracing the second flux from the another position; and, by repeating the calculation and the reverse tracing of flux, when the reversely traced flux no longer strikes the surface of the workpiece, carrying out comparison of the flux with an angular distribution of a flux incident on the workpiece, and when the current flux is within the angular distribution, obtaining an amount of flux that has contributed to the scattering for a flux group from the first flux to the current flux.

(13) A simulator provided with an arithmetic unit that simulates predetermined processing treatment to a workpiece, the simulator including the arithmetic unit to carry out calculation of the simulation method according to any one of (1) through (11).

(14) Processing equipment including a processing unit to carry out predetermined processing treatment to a workpiece and the simulator according to (13).

(15) The processing equipment according to (14), wherein the simulator has an input unit to obtain a processing condition in carrying out the predetermined processing treatment, and the processing condition obtained by the input unit includes information obtained by monitoring the processing treatment in the processing unit.

(16) The processing equipment according to (14) or (15), further including a control unit to correct a treatment condition in the predetermined processing treatment in the processing unit based on a result of simulation obtained by the simulator.

(17) A method of manufacturing a semiconductor device including, using the processing equipment according to any one of (14) through (16), carrying out the predetermined processing treatment to the workpiece taking at least a part of a semiconductor device as the workpiece.

Embodiments of the present disclosure are not limited to the above embodiments, and various other configurations are possible within the scope of embodiments in the present disclosure.

What is claimed is:

1. A simulation method, comprising:
   in an information processing device:
      reversely tracing a first flux from a first position,
         wherein the first flux is incident on the first position on a surface of a workpiece, wherein the workpiece is subjected to a determined processing treatment;
      calculating, based on the reverse trace of the first flux that strikes at a second position on the surface of the workpiece, a second flux by scattering at the second position and reversely tracing the second flux from the second position, said second flux being calculated based on an angle that is made by a normal vector and the first flux, wherein the normal vector is on the second position, wherein the surface of the workpiece is expressed based on a voxel model including a plurality of voxels, and wherein the first position is at a first center of gravity of a first voxel of the plurality of voxels and the second position is at a second center of gravity of a second voxel of the plurality of voxels;
      repeating the calculation of the second flux and the reverse tracing of the first flux till the first flux strikes the surface of the workpiece;
      comparing, based on the reverse trace of the first flux that has stopped striking the surface of the workpiece, a third flux with an angular distribution of the first flux that is incident on the workpiece;
      obtaining, based on a determination that the third flux is within the angular distribution, an amount of flux that has contributed to the scattering for a flux group from the first flux to the third flux;
      generating simulation information based on the amount of flux, wherein the simulation information comprises first information associated with shape development of the workpiece and second information associated with damage calculation of the workpiece; and
      controlling transmission of the transmission of the simulation information to an output interface.

2. The simulation method according to claim 1, wherein the surface of the workpiece is expressed based on a string model including a plurality of grid points, wherein the first position is at a first grid point of the plurality of grid points, and wherein the second position is at a second grid point of the plurality of grid points.

3. The simulation method according to claim 1, wherein, in reversely tracing the first flux, a tracing trajectory is a curved line based on an action on the first flux.

4. The simulation method according to claim 1, further comprising calculating the second flux from the first flux based on an energy loss of the first flux, wherein the energy loss of the first flux is based on a thickness of a film that is deposited on the second position.

5. The simulation method according to claim 1, wherein, in calculating the second flux based on the first flux, energy is distributed based on a mass of particles of the first flux and a mass of atoms constituting a film on the second position.

6. The simulation method according to claim 1, wherein the scattering is specular scattering or the specular scattering based on angular variation.

7. The simulation method according to claim 1, wherein the angular distribution of the first flux is obtained based on at least one of an analytic formula, a result of sheath simulation, or a database based on actual measurement.

8. The simulation method according to claim 1, further comprising calculating an etch rate by obtaining an ion scattering flux and by solving a surface reaction, wherein the surface reaction is solved based on the ion scattering flux.

9. The simulation method according to claim 8, further comprising calculating based on the etch rate, at least one of the shape development, the damage calculation, or crystal defect of the workpiece.

10. A non-transitory computer-readable medium having stored thereon computer-executable instructions for causing a computer to execute operations, the operations comprising:
   reversely tracing a first flux from a first position,
      wherein the first flux is incident on the first position on a surface of a workpiece, wherein the workpiece is subjected to a determined processing treatment;
   calculating, based on the reverse trace of first flux that strikes at a second position on the surface of the workpiece, a second flux by scattering at the second position and reversely tracing the second flux from the second position, said second flux being calculated based on an angle that is made by a normal vector and the first flux, wherein the normal vector is on the second position, wherein the surface of the workpiece is expressed based on a voxel model including a plurality of voxels, and wherein the first position is at a first center of gravity of a first voxel of the plurality of voxels and the second position is at a second center of gravity of a second voxel of the plurality of voxels;
   repeating the calculation of the second flux and the reverse tracing of the first flux till the first flux strikes the surface of the workpiece;
   comparing, based on the reverse trace of the first flux that has stopped striking the surface of the workpiece, a third flux with an angular distribution of the first flux that is incident on the workpiece;
   obtaining, based on a determination that the third flux is within the angular distribution, an amount of flux that has contributed to the scattering for a flux group from the first flux to the third flux;

generating simulation information based on the amount of flux, wherein the simulation information comprises first information associated with shape development of the workpiece and second information associated with damage calculation of the workpiece; and
controlling transmission of the simulation information to an output interface.

11. A simulator, comprising:
a Central Processing Unit (CPU) configured to:
simulate determined processing treatment to a workpiece;
reversely trace a first flux from a first position,
wherein the first flux is incident on the first position on a surface of the workpiece,
wherein the workpiece is subjected to the determined processing treatment;
calculate, based on the reverse trace of the first flux that strikes at a second position on the surface of the workpiece, a second flux by a scattering process at the second position and reverse trace the second flux from the second position, said second flux being calculated based on an angle that is made by a normal vector and the first flux, wherein the normal vector is on the second position, wherein the surface of the workpiece is expressed based on a voxel model including a plurality of voxels, and wherein the first position is at a first center of gravity of a first voxel of the plurality of voxels and the second position is at a second center of gravity of a second voxel of the plurality of voxels;
repeat the calculation of the second flux and the reverse trace of the first flux till the first flux strikes the surface of the workpiece;
compare, based on the reverse trace of the first flux that has stopped to strike the surface of the workpiece, a third flux with an angular distribution of the first flux that is incident on the workpiece;
obtain, based on a determination that the third flux is within the angular distribution, an amount of flux that has contributed to the scattering process for a flux group from the first flux to the third flux;
generate simulation information based on the amount of flux, wherein the simulation information comprises first information associated with shape development of the workpiece and second information associated with damage calculation of the workpiece; and
control transmission of the simulation information to an output interface of the simulator.

12. A processing equipment, comprising:
a simulator that includes:
a Capacitively Coupled Plasma (CCP) configured to process a workpiece by a determined processing treatment; and
a Central Processing Unit (CPU) configured to:
reversely trace a first flux from a first position,
wherein the first flux is incident on the first position on a surface of the workpiece,
wherein the workpiece is subjected to the determined processing treatment;
calculate, based on the reverse trace of the first flux that strikes at a second position on the surface of the workpiece, a second flux by a scattering process at the second position and reversely trace the second flux from the second position, said second flux being calculated based on an angle that is made by a normal vector and the first flux, wherein the normal vector is on the second position, wherein the surface of the workpiece is expressed based on a voxel model including a plurality of voxels, and wherein the first position is at a first center of gravity of a first voxel of the plurality of voxels and the second position is at a second center of gravity of a second voxel of the plurality of voxels;
repeat the calculation of the second flux and the reverse trace of the first flux, till the first flux strikes the surface of the workpiece;
compare, based on the reverse trace of the first flux that has stopped to strike the surface of the workpiece, a third flux with an angular distribution of the first flux that is incident on the workpiece;
obtain, based on a determination that the third flux is within the angular distribution, an amount of flux that has contributed to the scattering process for a flux group from the first flux to the third flux;
generate simulation information based on the amount of flux, wherein the simulation information comprises first information associated with shape development of the workpiece and second information associated with damage calculation of the workpiece; and
control transmission of the simulation information on an output interface.

13. The processing equipment according to claim 12, wherein the simulator further includes an input unit configured to obtain a condition to process the determined processing treatment, and wherein the condition includes third information obtained based on the determined processing treatment.

14. The processing equipment according to claim 12, further comprising a control unit configured to correct a treatment condition in the determined processing treatment, wherein the treatment condition is corrected based on a result of simulation obtained by the simulator.

* * * * *